United States Patent [19]

Sakamoto

[11] Patent Number: 5,608,539
[45] Date of Patent: Mar. 4, 1997

[54] IMAGE PROCESSING METHOD AND APPARATUS THEREOF

[75] Inventor: Masahiro Sakamoto, Tokyo, Japan

[73] Assignee: Canon Kabushiki Kaisha, Tokyo, Japan

[21] Appl. No.: 376,378

[22] Filed: Jan. 23, 1995

Related U.S. Application Data

[63] Continuation of Ser. No. 125,196, Sep. 23, 1993.

[30] Foreign Application Priority Data

Sep. 28, 1992 [JP] Japan ................................ 4-258693

[51] Int. Cl.$^6$ .................................................... H04N 1/41
[52] U.S. Cl. ........................ 358/426; 358/433; 358/448; 382/148
[58] Field of Search ..................................... 358/426, 433, 358/432, 262.1, 261.4, 451, 448, 453, 467, 407, 440; 382/36, 56, 148; H04N 1/41

[56] References Cited

U.S. PATENT DOCUMENTS

| | | | |
|---|---|---|---|
| 4,920,426 | 4/1990 | Hatori et al. ............................ | 358/433 |
| 5,212,565 | 5/1993 | Feintuch et al. ........................ | 358/433 |
| 5,253,056 | 10/1993 | Puri et al. ............................... | 358/133 |
| 5,255,105 | 10/1993 | Ireton et al. ............................ | 358/430 |
| 5,262,871 | 11/1993 | Wilder et al. ....................... | 358/213.11 |
| 5,276,532 | 1/1994 | Harrington ............................. | 358/444 |
| 5,345,517 | 9/1994 | Katayama et al. .................... | 358/451 |
| 5,392,133 | 2/1995 | Nakajima ............................... | 358/407 |

Primary Examiner—Edward L. Coles, Sr.
Assistant Examiner—Madeleine Anh-Vinh Nguyen
Attorney, Agent, or Firm—Fitzpatrick, Cella, Harper & Scinto

[57] ABSTRACT

An image processor inputs coded image data, which is comprised of a plurality of resolution levels, and image processor thereafter rearranges and stores the coded image data into image memory 4 so that the resolution levels of the coded image data can be stored into a consecutive address area of the image memory 4. Thereafter DMA controller 11 reads out the coded image data stored in the image memory 4 into decoder 7 by accessing the consecutive address area of the image memory 4. The decoder 7 decodes the coded image data transferred at high speed.

8 Claims, 5 Drawing Sheets

IMAGE PROCESSING METHOD AND APPARATUS THEREOF

This application is a continuation of application Ser. No. 08/125,196 filed Sep. 23, 1993.

BACKGROUND OF THE INVENTION

The present invention relates to an image processing method and apparatus thereof and, more particularly to an image processing method and apparatus capable of decoding the coded image data obtained in such a way that image data is divided into a plurality of stripes, each of which is then encoded into a plurality of frames having different resolution levels of this coded image data.

Figure 1:
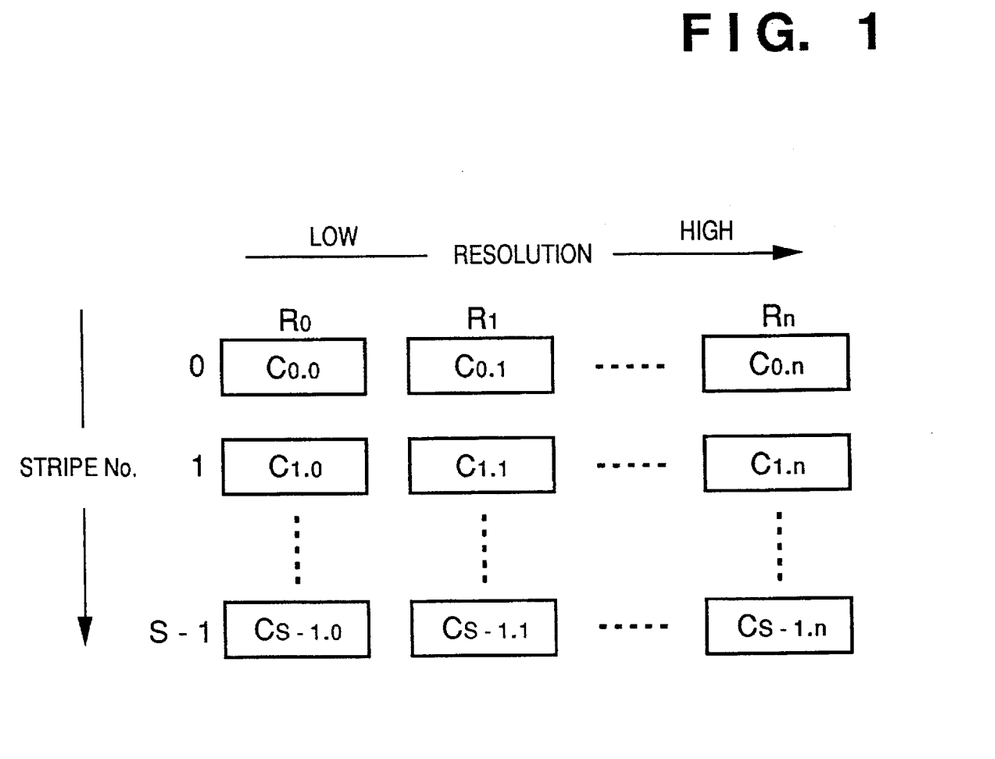
FIG. 1 is a diagram illustrating the structure of image data which is generated by a stripe hierarchical processing based on the JBIG (Joint Bi-level Image Coding Experts Group) method.

FIG. 1 is a diagram illustrating the structure of the image data when stripe hierarchical processing is performed using the JBIG (Joint Bi-level Image Coding Experts Group) method. The image data in each stripe is arranged from the left to the right in the sequence from a low resolution to high resolution. For example, the stripe having stripe No. 0 includes the image data $C_{0,0}, C_{0,1}, \ldots, C_{0,n}$. Similarly, the stripe 1 includes the image data $C_{1,0}, C_{1,1}, \ldots, C_{1,n}$. Further, the stripe S-1 includes the image data $C_{S-1,0}, C_{S-1,1}, \ldots, C_{S-1,n}$. Hereinafter, each of the image data $C_{x,y}$ (where x=0, ..., n, y=0, ..., n) is referred to as a "frame".

These frames are transferred in order from the lowest resolution frames to the highest. Herein, the order of being transferred in the same resolution's frames, is in the order of the stripe number. Namely, the order is as follows:

$C_{0,0}, C_{1,0}, \ldots, C_{S-1,0}, C_{0,1}, C_{1,1}, \ldots, C_{S-1,1}, \ldots, C_{0,n}, C_{1,n}, \ldots, C_{S-1,n}$.

Conventionally, in such an image processing apparatus, when coded image data is inputted and stored in an image memory, the coded image data is stored in an address sequence of the image memory in accordance with the image data inputted sequence. When the stored image data is decoded in order to form an image in full resolution, non-consecutive addresses are supplied to the image memory, and the corresponding image data are read and decoded.

However, in the conventional technique, when the coded image data is decoded, since the coded image data needs to be read out from the image memory using the non-consecutive address accesses, a simple mechanism for increment/decrement of an address pointing to the image memory is not satisfactory, considering that a complicated address switching control is required. Accordingly, it takes considerable time to access the coded image data, making it impossible to perform high-speed decoding.

Furthermore, since the accessing process for the image memory use non-consecutive addresses, DMA (Direct Memory Access) transfer means cannot be used, making it difficult to perform high-speed decoding.

SUMMARY OF THE INVENTION

In light of the above problems, it is an object of the present invention to provide an image processing method and apparatus capable of inputting and high speed decoding a plurality of components of coded image data obtained in such a way that image data is divided into a plurality of divisional elements, each of which is encoded into a plurality of components of coded image data.

It is another object of the present invention to provide an image processing method and apparatus capable of inputting and high speed decoding a plurality of resolution levels of coded image data obtained in such a way that image data is divided into a plurality of divisional elements, each of which is encoded into a plurality of resolution levels of coded image data.

It is another object of the present invention to provide an image processing method and apparatus capable of inputting and high speed decoding a plurality of resolution levels of coded image data obtained in such a way that image data is divided into a plurality of stripes, each of which is encoded into a plurality of resolution levels of coded image data.

It is another object of the present invention to provide an image processing method and apparatus capable of inputting and high speed decoding a plurality of resolution levels of coded image data obtained in such a way that image data is divided into a plurality of lines, each of which is encoded into a plurality of resolution levels of coded image data.

It is still another object of the present invention to provide an image processing method and apparatus capable of generating consecutive addresses for storage means where coded image data are stored and read by using DMA transfer method, and high speed decoding of coded image data.

Furthermore, it is another object of the present invention to provide an image processing method and apparatus capable of reading and decoding coded image data and forming an image at high speed by a sequential type of printer or stripe printing type of printer.

Other features and advantages of the present invention will become apparent according to the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 2:
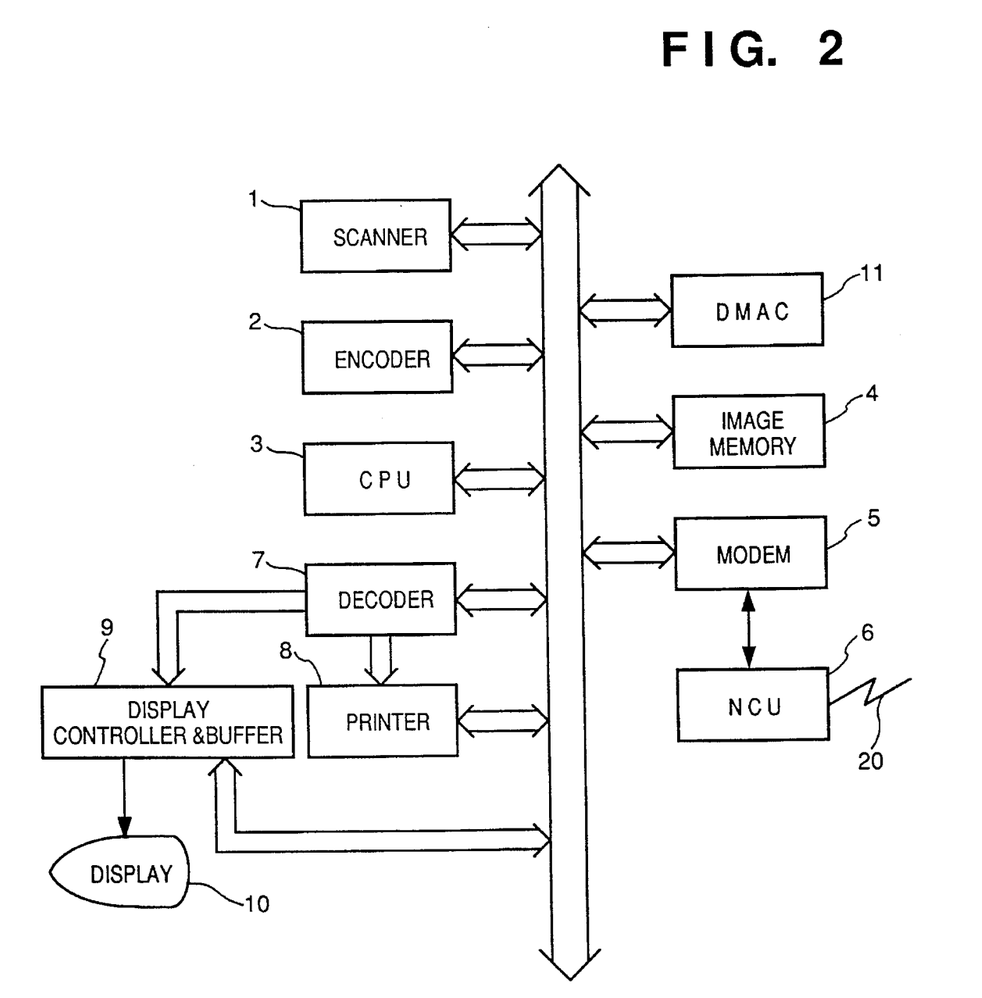
FIG. 2 is a block diagram illustrating the construction of an image processing apparatus according to the embodiment.

FIG. 2 is a block diagram illustrating the construction of an image processing apparatus according to the present invention. In the figure, numeral 1 denotes a scanner for reading an original document, numeral 2 denotes an encoder for encoding image data, numeral 3 denotes a CPU for controlling an entire system, numeral 4 denotes an image memory for storing coded image data, numeral 5 denotes a MODEM, numeral 6 denotes an NCU (Network Control Unit), numeral 7 denotes a decoder for decoding image data, and numeral 8 denotes a printer. Further, numeral 9 denotes a display controller & buffer, numeral 10 denotes a display, and numeral 20 denotes communication lines which are connected to the NCU 6 and transmits various signals. A DMA (Direct Memory Access) controller 11 independently controls the data transfer between the image memory 4 and other apparatuses such as; the decoder 7, MODEM 5, encoder 2, and scanner 1, without the CPU 3.

Figure 3:
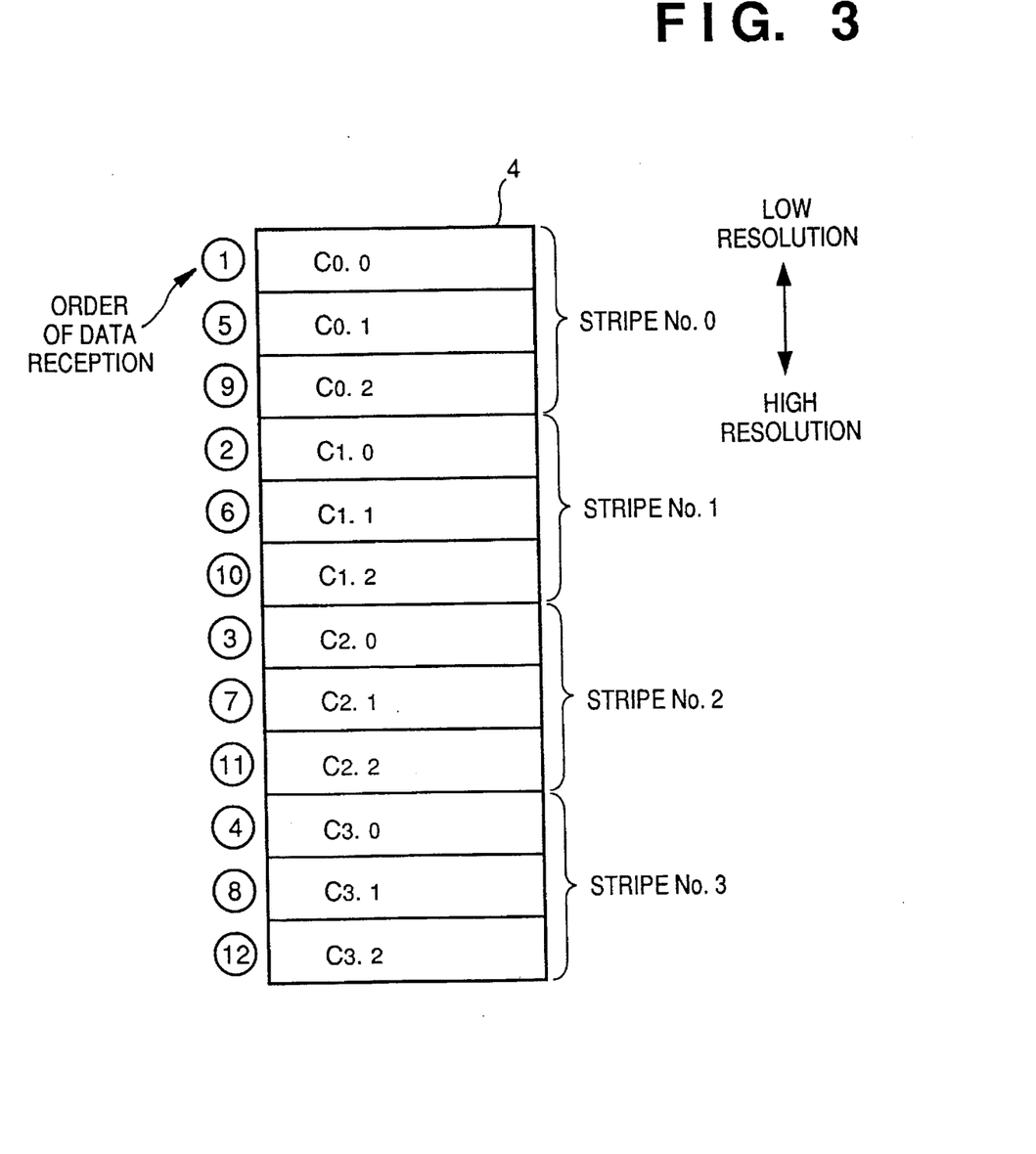
FIG. 3 is a diagram illustrating the arrangement of the image data in the image memory 4 according to the embodiment.

FIG. 3 is a diagram illustrating the arrangement of the coded image data inputted, rearranged and stored in the image memory 4 according to the embodiment. Herein, as an example of input coded data, the input coded data consists of four stripes and each stripe consists of three resolution levels of coded image data.

The procedure of inputting the coded image data at a progressive mode is described with reference to FIG. 3.

The coded image data inputted via communication lines 20 is transferred to the MODEM 5 via the NCU 6 and thereafter demodulated (See FIG. 2). With reference to FIG. 3, the coded image data at the progressive mode are inputted in the sequence of ① to ⑫. That is, the sequence of the data reception is as follows:

$C_{0,0}, C_{1,0}, C_{2,0}, C_{3,0}, C_{0,1}, C_{1,1}, C_{2,1}, \ldots, C_{3,2}$ In this way, the coded image data of the low resolution is inputted and stored in the image memory 4 in the order of the stripe number. Then, the coded image data of the intermediate resolution is inputted and stored in the order of the stripe number. Finally, the coded image data of the high resolution is inputted and stored in it in the order of the stripe number.

A case where a image data according to the coded image data is displayed by the display 10 is described below.

In this case, the inputted data is decoded by the decoder 7 in accordance with the sequence of the data input and the decoded data is then sequentially transferred to a buffer unit of the display controller & buffer 9 (See FIG. 2). Accordingly, the coded images of the low resolution to the high resolution are sequentially displayed on the display 10 in the order of the stripe number.

The method of printing the coded image data is described below.

A general printer which is currently used is a sequential or stripe printing type. In the case of printing in these type of printers, the decoded image data of at least one line or one stripe needs to be prepared in advance. However, since the sequence of the coded image data inputted in the progressive mode is from the lowest resolution to highest resolution, the coded image data of all resolution levels is needed for at least one line or one stripe.

In this embodiment, the order of inputted encoded image is rearranged and stored in the image memory 4 in order to read out each frame data in the same stripe using consecutive address accesses when decoding the coded image data stored in the image memory 4 in order to form an image according to the coded image data. After all the coded image data for one page is stored in the image memory 4, the coded image data stored in the consecutive addresses are transferred to the decoder 7 and the decoder 7 decodes the transferred coded image data in each stripe and thereafter generates sequential image data. The sequential image data is sequentially transferred to printer 8 and the printing is performed.

Figure 4:
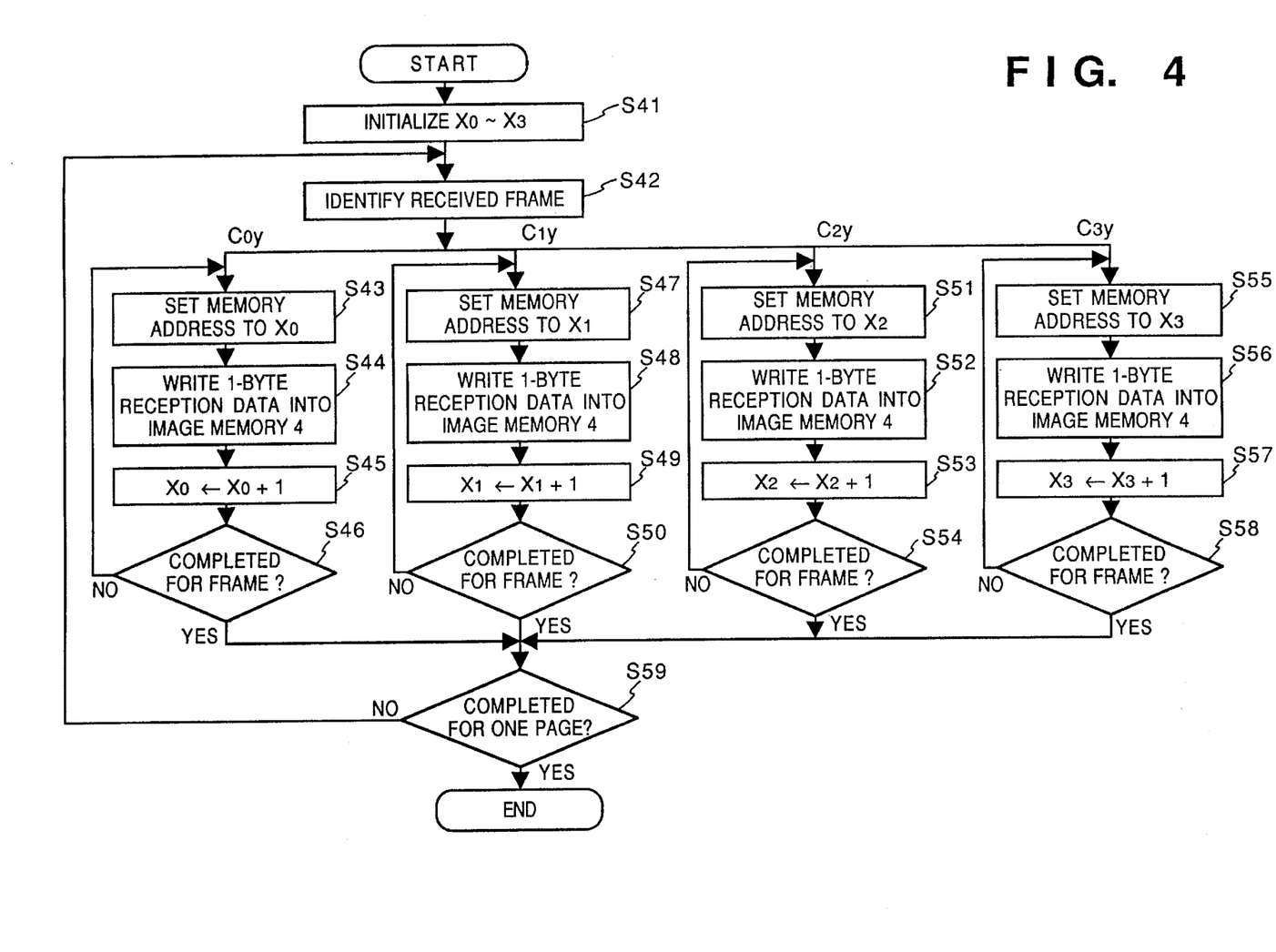
FIG. 4 is a flowchart for explaining the processes of storing coded image data in the image memory 4 according to the embodiment.

FIG. 4 is a flowchart for explaining the procedure of storing the input coded image data into the image memory 4 according to the embodiment. Note that the input coded image data in this example has four stripes (stripe Nos. 0–3), each of which includes three resolution levels ($R_0, R_1, R_2$).

First, at step S41, address pointers $X_0$–$X_3$ respectively indicating an address to store input coded image data are initialized. Each of the address pointers $X_0$–$X_3$ corresponds to where each of the input coded image data of the stripes 0–3 is stored in the image memory 4. Initialized values of the address pointers $X_0$–$X_3$ are respectively set so that the distance between each adjoining addresses, that is the address distance d of $X_0$–$X_1$, $X_1$–$X_2$, $X_2$–$X_3$, is large enough to be able to store one stripe of the coded image data from the low resolution to high resolution. Otherwise, when the address distance between $X_0$ and $X_1$ is small and if the coded image data is continuously written in the image memory 4 while $X_0$ is incremented, the data area of the stripe 0 may overlap with the data area of the stripe 1.

At step S42, the coded image data inputted via the MODEM 5 is identified with one of the stripes from 0 to 3. That are, the frames such as $C_{0,y}, C_{1,y}, C_{2,y}, C_{3,y}$ (y=1, . . . , 3) are identified. If the data is identified as stripe 0, the process proceeds to step S43 where the coded image data is stored in the address in the memory 4 pointed by the address pointer $X_0$. Similarly, if the coded image data is the stripe 1, the process proceeds to step S47 where the coded image data is stored in the address in the memory 4 pointed by the address pointer $X_1$. Similarly, if the coded image data is the stripe 2, the process proceeds to step S51 where the coded image data is stored in the address in the memory 4 pointed by the address pointer $X_2$. Furthermore, if the coded image data is the stripe 3, the process proceeds to step S55 where the coded image data is stored in the address in the memory 4 pointed by the address pointer $X_3$.

At step S43, $X_0$ is selected as an address pointer to the image memory 4. At step S44, one byte of the coded image data is written in the image memory 4 by using $X_0$. At step S45, the address pointer $X_0$ is incremented in order to write the next one-byte coded image data. At step S46, it is determined whether or not the writing of one frame has been completed. If coded image data to be written remains, the process returns to step S43 and the process of writing the rest of data is performed.

The processing of steps S47–S50, steps S51–S54, and steps S55–S58 are similar to the steps S43–S46 except that the writing address differs from each other.

At step S59, it is determined whether or not writing of the coded image data for one page has been completed. If not, the process returns to step S42 and the processing of the following frame is performed.

Figure 5:
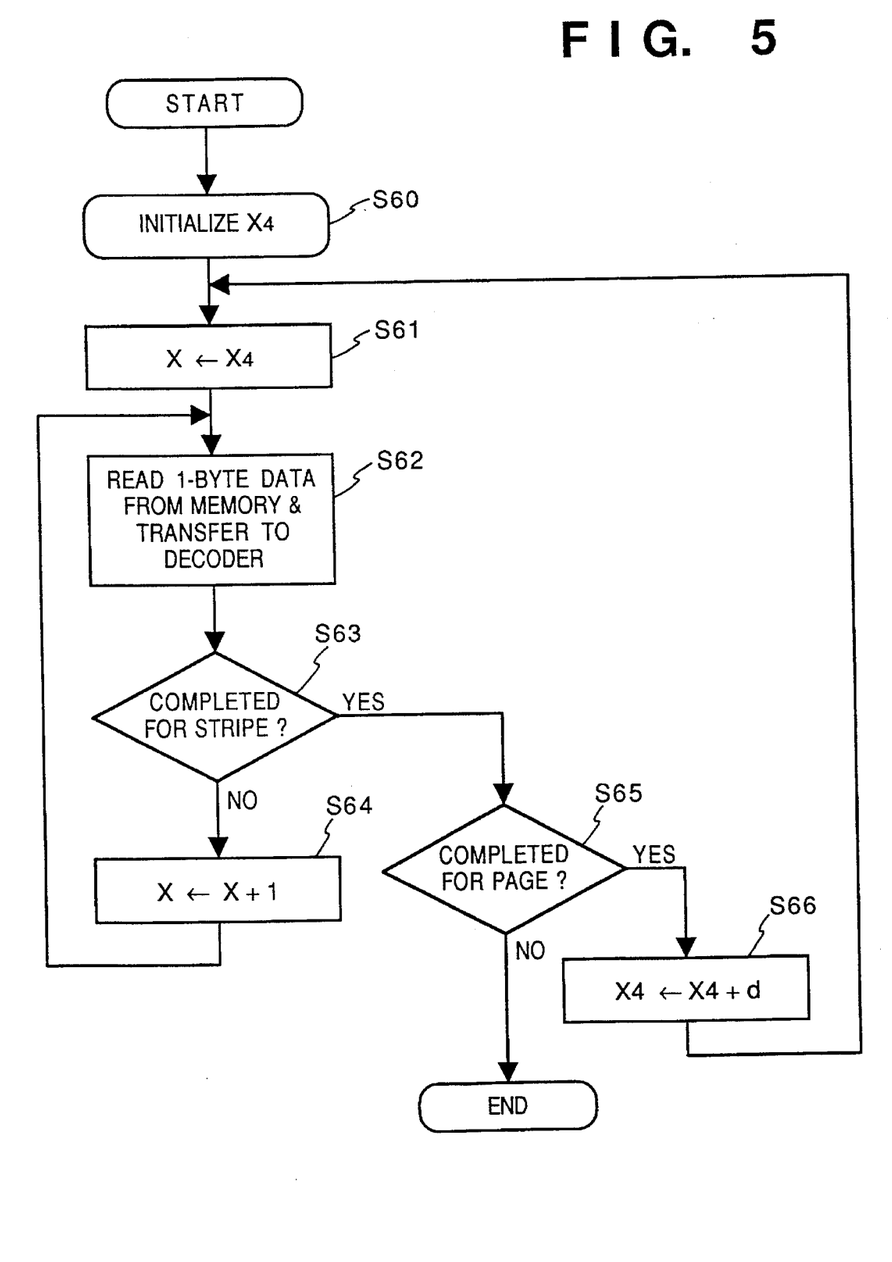
FIG. 5 is a flowchart for explaining the processes of reading coded data from the image memory 4 and transferring the coded image data into a decoder 7.

The procedure for reading out the coded image data stored in the image memory 4, transferring to the decoder 7, and decoding by the decoder 7 is described with reference to the flowchart of FIG. 5.

At step S60, a stripe pointer $X_4$ for pointing a leading address of each stripe is set to the leading address of the coded image data stored in the image memory 4. That is, the address pointer $X_4$ points to the address where the first data of the lowest resolution, in a first stripe, is being stored.

At step S61, a value of the stripe pointer $X_4$ is set to the address pointer X in order to access the image memory using the address pointer X. At step S62, one byte of the coded image data stored in the image memory 4 pointed by the address pointer X is read out and transferred to the decoder 7. In the decoder 7, the transferred data is decoded. At step S63, it is determined whether or not the data transfer for one stripe has been completed. If not, the process proceeds to step S64 and the stripe data processing is continued. If the data transfer for one stripe has been completed, the process proceeds to step S65. At step S64, the address pointer X is incremented in order to read out the next coded image data. Then, the process returns to step S62 and the reading processes are repeated in the same manner as described above.

At step S65, it is determined whether or not the data transfer for one page has been completed. If not, the process proceeds to step S66 where the data transfer processing for the next stripe begins. When the data transfer for one page has been completed, the transfer processing to the decoder 7 ends.

At step S66, the value of the stripe pointer $X_4$ is set to the leading address of the next stripe. That is, the address distance d between each stripe is added to the stripe pointer $X_4$ and the result is set to the stripe pointer $X_4$ as the leading address of the next stripe. Then, the process returns to step S61 and the data transfer of the next stripe is executed in the same manner as described above.

On the other hand, in decoder 7, the coded image data transferred from the image memory 4 is decoded in the order of which it was placed in the decoder 7.

According to the present embodiment, the following advantages are obtained.

(1) Since the coded image data in the same stripe is stored based on the resolution level, when the coded image data is transferred from the image memory 4 to the decoder 7, in the case of decoding, the address pointer for the image memory 4 can be simply incremented without complicated address control.

(2) Since the coded image data is accessed in consecutive addresses, the DMA controller 11 can be easily used for coded image data transfer, resulting in an increase in performance of the decoding processing.

As described above, according to the present embodiment, the coded image data can be decoded at high speed.

Further, high speed decoding of a plurality of components, in each divisional element in the coded image data, is possible.

Furthermore, high speed decoding of a plurality of resolution levels in each divisional element in the coded image data, is possible.

Furthermore, high speed decoding of a plurality of resolution levels in each stripe in the coded image data, is possible.

Furthermore, high speed decoding of a plurality of resolution levels in each line in the coded image data, is possible.

Still further, since consecutive addresses are generated in order to access the storage means, where the coded image data is stored and read out, high-speed decoding can be performed by the DMA transfer.

Still further, the coded image data are read out and decoded, and an image formation can be performed at a high speed in a sequential or stripe printing printer according to the decoded image data.

The present invention can be applied to a system consisting of a plurality of devices, or to an apparatus comprising a single device. Furthermore, it goes without saying that the invention is also applicable to cases where the object of the invention is attained by supplying a program to a system or apparatus.

It is apparent that many widely different embodiments of the present invention can be made without departing from the spirit and scope thereof, thus it is to be understood that the invention is not limited to the specific embodiments thereof except as defined in the appended claims.

What is claimed is:

1. An image processing apparatus for processing encoded image data, the encoded image data consisting of a plurality of data frames obtained by dividing an image into a plurality of stripes, producing a plurality of images having different resolution levels for each of the plurality of stripes and encoding each of the plurality of images having different resolution levels for the plurality of stripes into each of the plurality of data frames, said image processing apparatus comprising:

reception means for receiving the encoded image data, said reception means consecutively receives a plurality of data frames representing images having an identical resolution level for the plurality of stripes;

storage means for storing the encoded image data received by said reception means, so as to store a plurality of data frames representing images having different resolution levels for an identical stripe in consecutive address areas;

read out means for reading out the encoded image data from said storage means, so as to consecutively read out a plurality of data frames representing images having different resolution levels for an identical stripe; and decoding means for decoding the encoded image data read out from said storage means, said decoding means consecutively decodes the plurality of data frames representing images having different resolution levels for each of the plurality of stripes and consecutively generates image data representing images of the plurality of stripes.

2. An apparatus according to claim 1, wherein said reception means receives the encoded image data, from the data frame representing an image having a low resolution level to the data frame representing an image having a high resolution level.

3. An apparatus according to claim 1, wherein said storage means stores the encoded image data so as to store a plurality of data frames received continuously into discontinuous address areas.

4. An apparatus according to claim 1, further comprising print means for printing an image in accordance with the image data generated from said decoding means.

5. An image processing method for processing encoded image data, the encoded image data consisting of plurality of data frames obtained by dividing an image into a plurality of stripes, producing a plurality of images having different resolution levels for each of the plurality of stripes and encoding each of the plurality of images having different resolution levels for the plurality of stripes into each of the plurality of data frames, said image processing method comprising:

reception step of receiving the encoded image data, in said reception step, a plurality of data frames representing images having an identical resolution level for the plurality of stripes are consecutively received;

storage step of storing the encoded image data received in said reception step, so as to store a plurality of data frames representing images having different resolution levels for an identical stripe in consecutive address area;

read out step of reading gout the encoded image data stored in said storage step, so as to consecutively read out a plurality of data frames representing images having different resolution levels for an identical stripe; and decoding step of decoding the encoded image data read out in said read out step, in said decoding step, consecutively decodes the plurality of data frames representing images having different resolution levels for each of the plurality of stripes are consecutively decoded and image data representing images of the plurality of stripes are consecutively generated.

6. A method according to claim 5 in said reception step, the encoded image data is received in order from the data frame representing an image having a low resolution level to the data frame representing an image having a high resolution level.

7. A method according to claim 5, wherein in said storage step, the encoded image data is stored so as to store a plurality of data frames received continuously into discontinuous address areas.

8. A method according to claim 5, further comprising print step of printing an image in accordance with the image data generated in said decoding step.

* * * * *

UNITED STATES PATENT AND TRADEMARK OFFICE
CERTIFICATE OF CORRECTION

PATENT NO. : 5,608,539

DATED : March 4, 1997

INVENTORS : MASAHIRO SAKAMOTO

It is certified that error appears in the above-identified patent and that said Letters Patent is hereby corrected as shown below:

COLUMN 1

Line 54, "use" should read --uses--.

COLUMN 3

Line 12, "transmits" should read --transmit--;
  Line 40, "a" should read --an--.

COLUMN 4

Line 14, "$X_0 \ X_3$" should read --$X_0$-$X_3$--;
  Line 25, "are," should read --is,--.

COLUMN 6

Line 64, "area;" should read --areas;--

UNITED STATES PATENT AND TRADEMARK OFFICE
CERTIFICATE OF CORRECTION

PATENT NO. : 5,608,539

DATED : March 4, 1997

INVENTORS : MASAHIRO SAKAMOTO

It is certified that error appears in the above-identified patent and that said Letters Patent is hereby corrected as shown below:

<u>COLUMN 6</u> continued

Line 65, "gout" should read --out--.

<u>COLUMN 7</u>

Line 11, "claim 5" should read --claim 5, wherein--.

Signed and Sealed this

Second Day of September, 1997

*Attest:*

BRUCE LEHMAN

*Attesting Officer*     Commissioner of Patents and Trademarks